United States Patent
Bonde

(10) Patent No.: US 9,300,777 B2
(45) Date of Patent: Mar. 29, 2016

(54) HEADSET BASE WITH HOLDER FOR MOBILE COMMUNICATION DEVICE

(71) Applicant: GN Netcom A/S, Ballerup (DK)

(72) Inventor: Jesper Bonde, Malmo (SE)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 14/302,892

(22) Filed: Jun. 12, 2014

(65) Prior Publication Data

US 2014/0294173 A1   Oct. 2, 2014

Related U.S. Application Data

(63) Continuation-in-part of application No. PCT/EP2011/072704, filed on Dec. 14, 2011.

(51) Int. Cl.
*H04M 1/60* (2006.01)
*H04M 1/04* (2006.01)
(Continued)

(52) U.S. Cl.
CPC ............ *H04M 1/6033* (2013.01); *G06F 1/1632* (2013.01); *H04M 1/04* (2013.01); *H04M 1/6058* (2013.01); *H04M 1/6066* (2013.01); *H04M 1/7253* (2013.01); *H04M 2250/22* (2013.01)

(58) Field of Classification Search
CPC ............ H04M 1/6066; H04M 1/7253; H04M 1/72502
USPC .................................. 455/41.2, 569.1, 575.2
See application file for complete search history.

(56) References Cited

U.S. PATENT DOCUMENTS

| 4,735,377 A | 4/1988 | Zuehsow |
| 5,923,737 A | 7/1999 | Weishut et al. |
| 5,991,645 A * | 11/1999 | Yuen et al. ................. 455/575.2 |

(Continued)

FOREIGN PATENT DOCUMENTS

| CH | 2575906 | 11/2008 |
| EP | 1990982 | 11/2008 |

(Continued)

OTHER PUBLICATIONS

"GN 9350 Guide for Basic Set-up and Use"; Internet citation, Dec. 31, 2005, pp. 1-9, XP002552129, Retrieved from the Internet: url:http://www.paritel.fr/wp-content/uploads/Casque%20GN9350.pdf.

(Continued)

*Primary Examiner* — Creighton Smith
(74) *Attorney, Agent, or Firm* — Altera Law Group, LLC

(57) ABSTRACT

A headset base unit comprising a base housing, a first connection device, by means of which the headset base unit is connectable to at least one telecommunication device, such as a desk phone or a PC phone. Furthermore, the headset base unit comprises a second connection device, by means of which the headset base unit is connectable to a headset, and a device holder for holding a mobile communication device with a device user interface. The headset base comprises control means, by means of which an audio channel can be opened between the headset base unit and a selected one of the telecommunication devices. The headset base unit is adapted to receive control commands from the mobile communication device for controlling the selected telecommunication device connected to the first connection device, whereby a user can control the telecommunication device by means of the device user interface.

20 Claims, 7 Drawing Sheets

(51) Int. Cl.
*G06F 1/16* (2006.01)
*H04M 1/725* (2006.01)

(56) References Cited

U.S. PATENT DOCUMENTS

| | | |
|---|---|---|
| 6,941,114 B1 | 9/2005 | Kuo et al. |
| 7,941,147 B2 * | 5/2011 | Bennett et al. ................ 455/436 |
| 8,838,029 B2 * | 9/2014 | Goldman et al. ............. 455/41.2 |
| 2004/0224650 A1 | 11/2004 | Hundal et al. |
| 2006/0252470 A1 | 11/2006 | Seshadri et al. |
| 2006/0291045 A1 | 12/2006 | Nakamura et al. |
| 2008/0001774 A1 | 1/2008 | Huang et al. |
| 2008/0280561 A1 | 11/2008 | Lin |
| 2009/0010246 A1 | 1/2009 | Grattan et al. |
| 2009/0121680 A1 | 5/2009 | Kikuchi |
| 2010/0062731 A1 | 3/2010 | Ham et al. |
| 2010/0137038 A1 | 6/2010 | Scholz et al. |
| 2010/0141839 A1 | 6/2010 | Supran et al. |
| 2010/0162153 A1 | 6/2010 | Lau |
| 2010/0216448 A1 | 8/2010 | Jeon et al. |
| 2010/0285750 A1 * | 11/2010 | Simonelic .................... 455/41.3 |
| 2011/0275323 A1 * | 11/2011 | Goldman et al. ............ 455/41.2 |
| 2011/0306393 A1 * | 12/2011 | Goldman et al. .......... 455/575.2 |
| 2012/0052852 A1 * | 3/2012 | Goldman ...................... 455/418 |
| 2014/0092775 A1 * | 4/2014 | Goldman ...................... 370/254 |
| 2014/0140501 A1 * | 5/2014 | Goldman et al. ............. 379/454 |
| 2014/0295758 A1 * | 10/2014 | Pedersen ..................... 455/41.2 |
| 2014/0298309 A1 * | 10/2014 | Proschowsky ................ 717/170 |

FOREIGN PATENT DOCUMENTS

| | | |
|---|---|---|
| WO | WO 00/07345 | 2/2000 |
| WO | WO 2007/143720 | 12/2007 |
| WO | WO 2008/116999 | 10/2008 |
| WO | WO 2010/083828 | 7/2010 |

OTHER PUBLICATIONS

Europears Search Report for EP Application No. 10164935.8.
Chinese Office Action with English translation for Chinese application 200980154921.0 dated Jun. 5, 2013.
Desktop Electronic Calculator (big digit calculator with tilt head LCD) retrieved on Sep. 25, 2012, located at http://www.amazon.com/Desktop-Electronic-Calculator-digit-calculator/dp/B001GUMF9C/ref=sr_1_1?ie=UTF8&qid=1348612176&sr=8-1&keywords=Desktop+Electronic+Calculator+%28big+digit+calculator+with+tilt+head+LCD%29.

* cited by examiner

HEADSET BASE WITH HOLDER FOR MOBILE COMMUNICATION DEVICE

TECHNICAL FIELD

The disclosure relates to a headset base unit comprising:
a base housing,
a first connection device, by means of which the headset base unit is connectable to at least one telecommunication device, such as a desk phone or a PC phone,
a second connection device, by means of which the headset base unit is connectable to the headset,
a device holder for holding a mobile communication device with a device user interface, and
a third connection device, by means of which the headset base unit is connectable to the mobile communication device.

BACKGROUND ART

Today there are many different ways of communicating via modern technology, such as PSTN telephony, IP telephony and mobile telephony, SMS, instant messaging (chat), video conferencing, voice-mail, presence information etc. It is common for people to have both a mobile phone, and a desk phone/soft phone. A mobile phone is very practical when the user is away from his desk, but when he is working at his desk he may in many cases prefer to use a desktop phone or a soft phone. He may also prefer to use a headset, as this allows him to simultaneously operate his computer, write on a paper, looking in drawers with both hands etc. It may also be desirable that the user's presence status on computer or telecommunications network is updated, when the user arrives at his desk. Presence status is real time information about a person's ability and willingness to communicate. Other persons on the same network or connected to the same presence service provider can be updated in real time with presence status of his contacts. All this relates to what is termed "unified communications". An example of a unified communications system is Microsoft Lync.

A headset base unit is a unit, which is arranged between a headset and one or more telecommunication devices, such as a PSTN (Public Switched Telephone Network) desk phone, and IP (Internet Protocol) desk phone, an IP soft phone (installed on a computer) and a mobile phone. The headset base unit normally comprises a headset holder for holding the headset when not in use. The headset comprises one or two earphones and a microphone. The headset base unit is typically placed on a desk beside a telephone and/or a PC. When the user wants to use the headset, he picks up the headset and arranges on his ear or head. The headset can be connected to the headset base unit by a wire or wirelessly. In both cases, the user's hands are free for other purposes such as using the computer or handling papers while communicating via the headset.

A mobile communication device is a broad group of devices comprising mobile phones, PDAs (personal digital assistants), media players, tablet computers etc.

US 2010/0081473 discloses a headset base unit with holder for mobile communication device.

SUMMARY DISCLOSURE

The object of the disclosure is to provide a new and improved headset base unit with a holder for a mobile communication device. The headset base according to the disclosure is characterised in control means, by means of which an audio channel can be opened between the headset base unit and a selected one of the telecommunication devices, and that the headset base unit is adapted to receive control commands from the mobile communication device for controlling the selected telecommunication device connected to the first connection device, whereby a user can control the telecommunication device by means of the device user interface. In this way, the user can utilize the user interface of his mobile communication for telecommunication via other channels while working at his desk, and at the same time presence status etc. can be updated.

The headset base unit may preferably comprise a headset holder for holding the headset.

The headset base unit may be simultaneously connectable to more than one telecommunication device.

Preferably, one or more of headset speaker volume, microphone volume, microphone mute and speaker equalisation can be adjusted by means of the device user interface.

According to an embodiment of the disclosure, the second connection device comprises a first transceiver for wireless connectivity to the headset, which headset is wireless and comprises a headset transceiver.

According to another embodiment, the third connection device comprises a second transceiver for wireless communication with the mobile communication device comprising a corresponding transceiver.

The disclosure also relates to a headset base system comprising a headset base unit as described above and a mobile communication device with a device user interface.

The user interface of the mobile communication device may comprise a display.

The display is preferably a touch-screen display.

The display may be adapted to display a keypad for entering a telephone number.

Preferably, a connected telecommunication device can be selected by touching a device icon representing the telecommunication device.

According to an embodiment, a caller identity icon is shown on the display when there is an incoming call on a connected telecommunication device.

If the headset is wireless, the display may be adapted to show battery status of the headset.

The disclosure also relates to a headset system comprising a headset base unit as described above and a headset.

The disclosure also relates to a communication system comprising a headset system as described above and at least on connected telecommunication device, wherein the headset base unit is adapted to be able to instruct a connected telecommunication device to initiate an outgoing call.

BRIEF DESCRIPTION OF THE DRAWINGS

The disclosure is explained in detail below with reference to the drawings illustrating embodiments of the disclosure and in which FIG. 8 is a figure like FIG. 1 except that it includes a second holder 10a and permanent or removable screen/keyboard 12a.

MODES FOR CARRYING OUT THE DISCLOSURE

It should be noted that the drawings are schematic and only elements most essential for the explanation of the disclosure are disclosed here. Many details, which are well known and easy to implement for a skilled person are left out for clarity reasons. The same reference signs are, in several instances, used for the same or corresponding parts.

Figure 1:
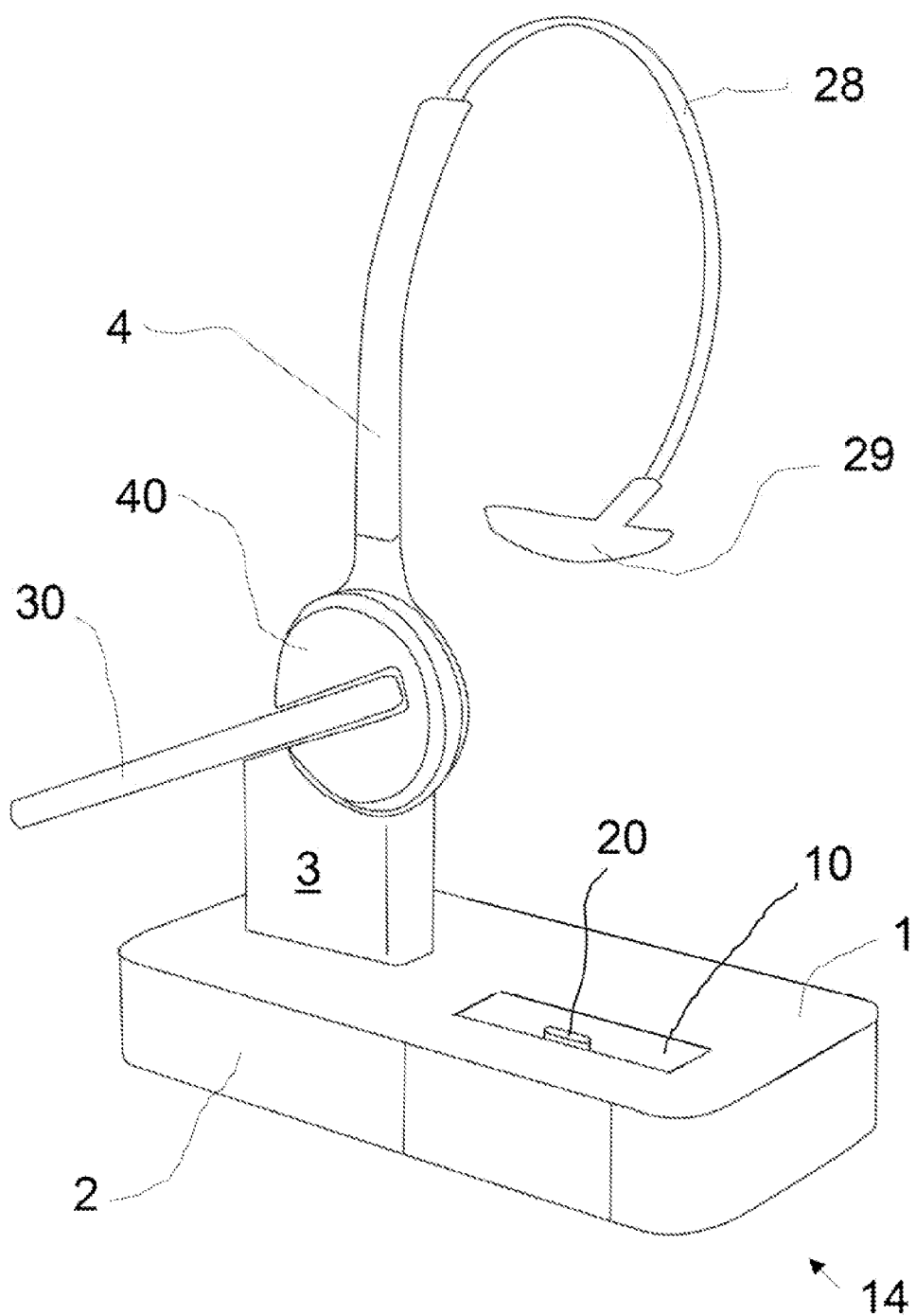
FIG. 1 is a perspective view of a headset system according to a first embodiment of the disclosure.
Figure 2:
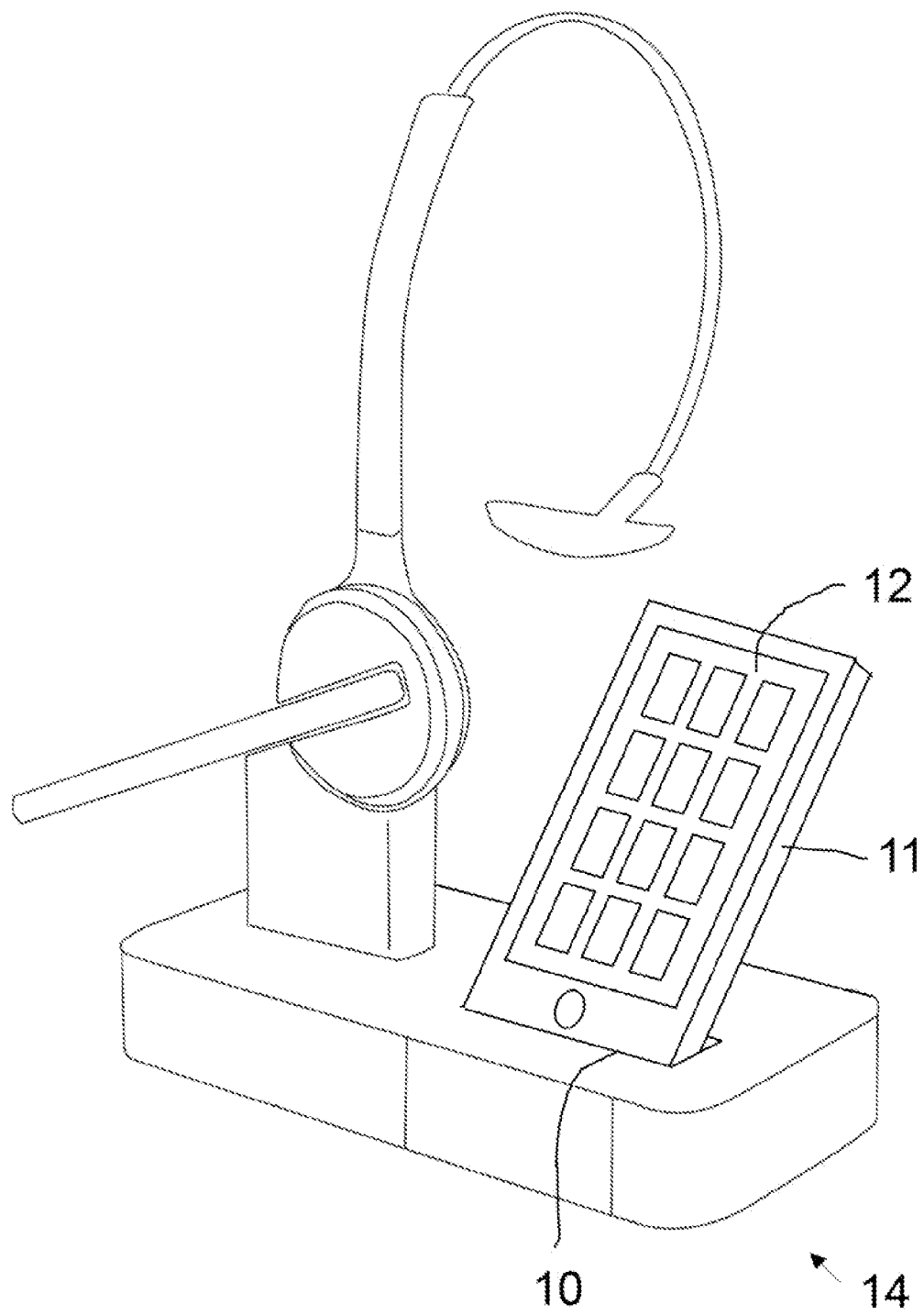
FIG. 2 is a perspective view of the headset system according to the first embodiment of the disclosure with a smart phone placed in the holder.

FIGS. 1 and 2 disclose a headset system 14 comprising a base unit 1 according to a first embodiment of the disclosure and a headset 4. The headset base unit 1 comprises a base housing 2, a headset holder 3, a device holder 10 and a device connector 20. The headset holder 3 is shaped as a post for receiving the headset 4. In FIGS. 1 and 2, the headset 4 is received by the headset holder 4. The headset 4 comprises a circular earphone 40, a microphone arm 30, a headband 28 and an end piece 29. It is not visible on the drawing but a charging terminal on the holder 3 is an electrical contact with a corresponding charging terminal on the earphone 40, when the headset 4 is held by the headset holder 3. The base housing 2 comprises a device holder 10 for holding a mobile communication device, such as a smart phone 11. The device holder 10 is provided as a recess in the top surface of the base housing 2 and a connector 20 is provided in the recess 10. In FIG. 2, a smartphone 11 is arranged in the recess 10 such that the connector 20 is engaged with a corresponding connector on the smart phone 11. In this embodiment, the connector 20 is a Micro-B USB connector. However, other types of connectors could be used.

The smart phone 11 comprises a touch screen display 12, which is easy to watch and touch due to the inclined position of the smart phone 11. The touch screen display 12 is, off course, works as a user interface for controlling the functions of the smart phone. However, the touch screen display 12 of the smart phone 11 may according to the disclosure also be utilized for controlling functions not directly related to the smart phone 11, which will be explained further in the following.

Figure 3:
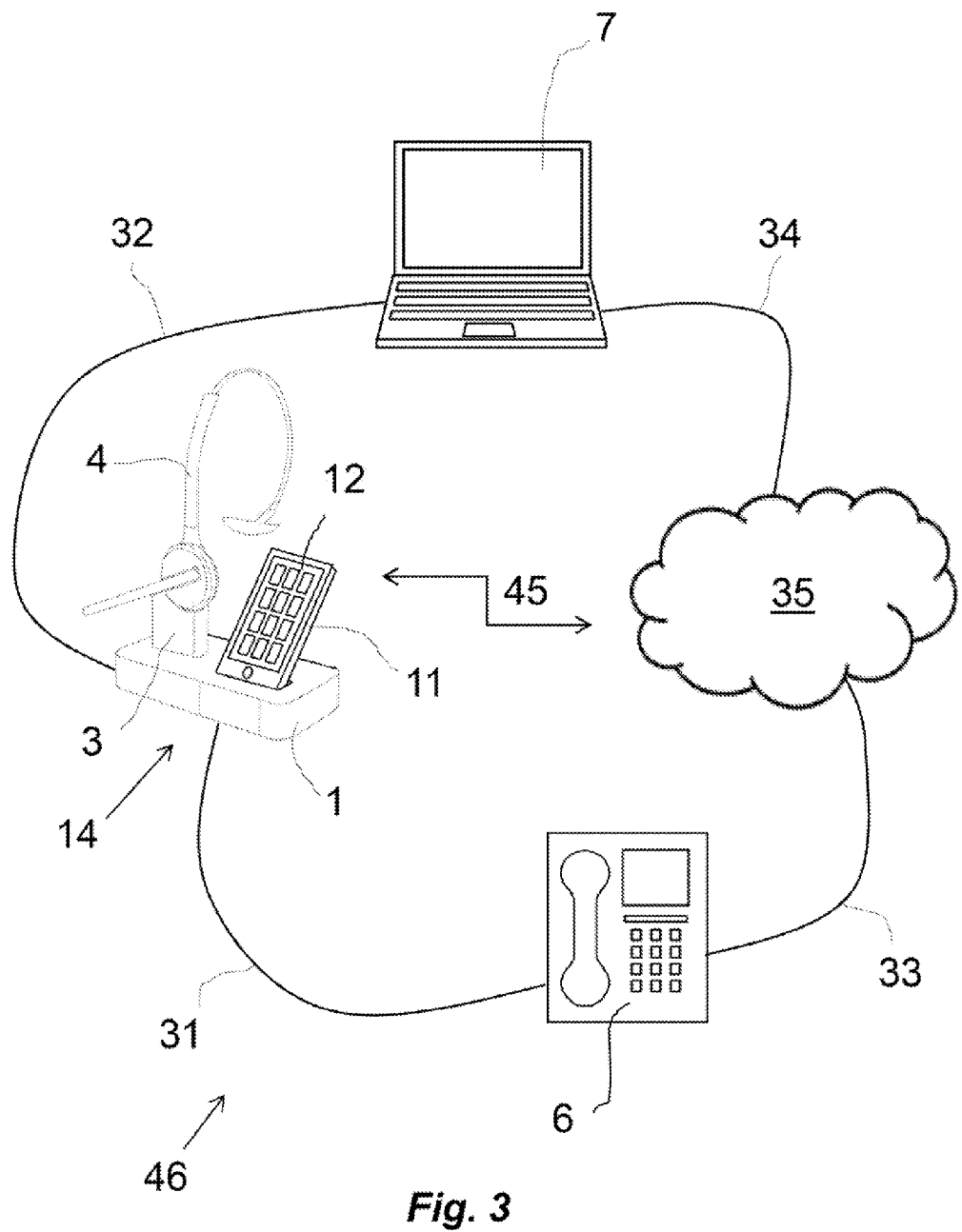
FIG. 3 is a communication system comprising the first embodiment of the headset base system according to the disclosure and a desk phone and a laptop computer.

FIG. 3 discloses a communication system 46, where the headset base unit 1 according to the first embodiment is connected to a desk phone 6 by means of a cable 31 and to a laptop computer 7 by means of a cable 32. The desk phone 33 is by means of a connection 33 connected to an external communications network 35. In addition, the laptop 7 is by means of a connection 34 connected to the external communications network 35. The external communications network 35 is a world-wide network comprising the public switched telephone network (PSTN), which is the network of the world's public circuit-switched telephone networks including fixed as well as mobile phones, and the Internet, which is the network of the world's public IP-based packet-switched networks. The smart phone 11 is also connected to the external communications network 35 by means of a GSM link 14.

A so-called "app" (application) is installed on the smart phone 11 in order to expand it with added functionally to cover functions not directly related to the smart phone. Thus, the added functionality comprises call management relating to calls on the desk phone 6 and soft phone calls on the laptop computer 7. The headset base unit 1 itself is adapted to handle calls on the desk phone 6 and the laptop computer 7, but the user may manage these calls by means of the touch-screen display 12 of the smartphone 11. The app can be configured to provide direct access between the smart phone screen and keyboard and the base 2 via connector 20 so that keystrokes on the smartphone, when engaged with the connector act as if they are a dedicated keyboard for the base. This can be done by running an appropriate software script on the smartphone to redirect keystrokes and screen display, with additional software to interpret outputs from the phone to the connect which may optionally be in the base or headset. Alternatively, the smart phone may run an app which links to the base or headset via the internet or a local area network (LAN), Bluetooth®, Zigbee® or similar short range wireless network, which the base/headset is also already joined to.

Another embodiment which is also shown in FIG. 2, has a cradle recess/device holder 10 with a "dumb" keyboard display unit 11 which is not a smart phone but of a type known in the GN 9470 product, except removable via connector 20. The dumb unit 11 may be replaced by a smart phone, which is sized to be received in the holder. Thus, in this embodiment, the user may use the dumb screen/keyboard in place of the smart phone when the smart phone is unavailable by merely swapping it out. The software in the base or headset will detect which device is present.

Figure 8:
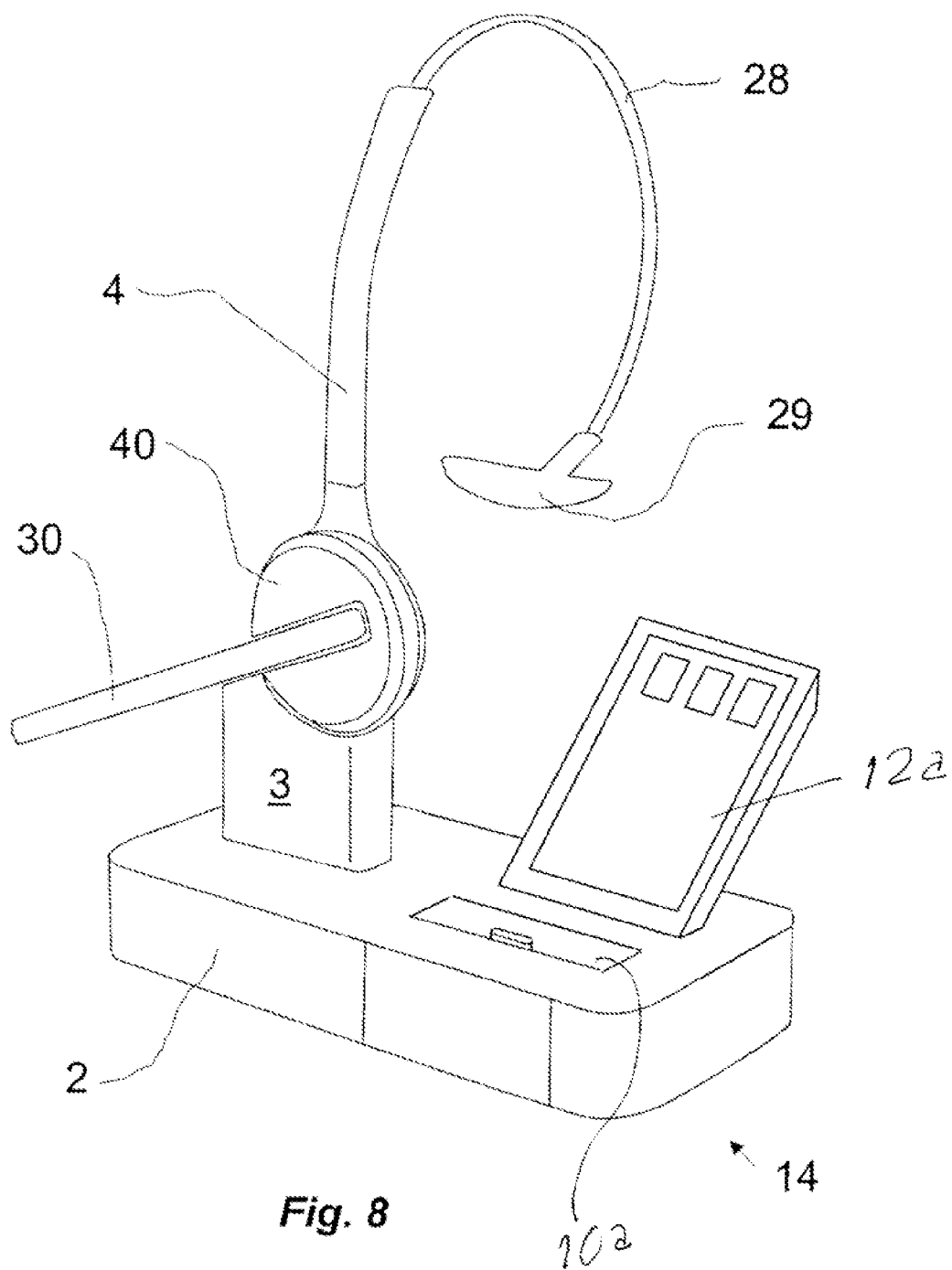

A further embodiment is shown in FIG. 8 where the base has two holders 10 and 10a to accommodate multiple devices (smart phone/dumb screens) or where, the dumb screen 12a is permanently affixed to the base and a holder 10a can receive another device such as a smart phone. When a smart phone is placed in holder 10a, it notifies the base and headset to supersede the control of screen 12a. If two smart devices are plugged into holders 10/10a, the system will preferably determine that the front most has control and the rearmost will merely be providing power for charging.

When the user sits at his desk with the desk phone 6, the laptop 7 and the headset system 14 with his smart phone 11 docked in the headset base unit 1, he may use the headset 4 for telephone calls via the desk phone 6, the laptop 7 and the smart phone 11. He may as an example manage calls in the following ways: the headset base unit 1 detects, that the smart phone 11 is docked, and the communication software on the laptop is informed that the user is "present" at the desk. This may be achieved by many means. Thus, the softphone on the laptop may be set to be automatically selected for outgoing calls. If the user enters a phone number by means of the touch-screen display, the outgoing call is executed as an Internet Protocol call by the soft phone on the laptop 7. The user will communicate via the wireless headset 4 and may not care about, whether the call is a desk phone call, a soft phone call or a mobile phone call. If there is an incoming call on any of the desk phone 6, the laptop 7 and the smart phone 11, the user may put on the headset 4 and accept the call by touching an "accept call" soft button on the touch-screen display 12. If the user is having a call on his smart phone 11 using the headset 4 and wants to leave the office, he may dock the headset 4 on the headset holder 3, pick up the smartphone 11 from the device holder 10 and continue the call while leaving the office. If the user is in a call on either the desk phone 6 or the laptop 7 and wants to leave the office, he may touch a soft button on the display 12 for transferring the call to his smart phone 11, before he is docking the headset 4 and picking up the smart phone 11. When he takes the smart phone 11 out of the device holder 10, the communications software on the laptop 7 is informed that the user is "not present" and all incoming calls to the soft phone may be set to be transferred to the smart phone.

Figure 4:
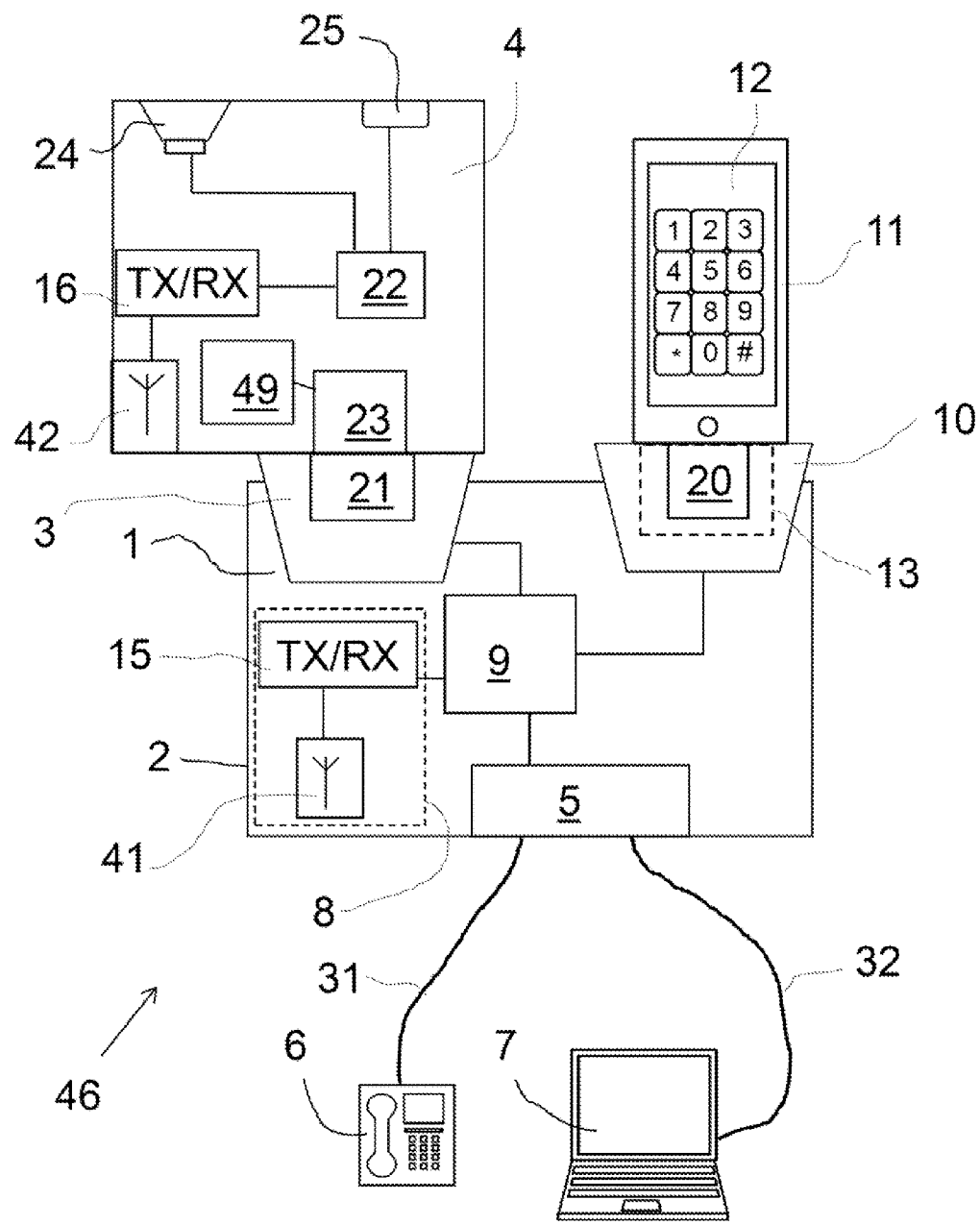
FIG. 4 is the communication system of FIG. 3, the headset system is disclosed diagrammatic.

FIG. 4 discloses a diagram of the headset system 14. As earlier mentioned, the headset base unit 1 comprises a base housing 2, a headset holder 3, a device holder 10 with a device connector 20. The headset base unit 1 also comprises a processor 9, a first connection device 5, a second connection device 8, a headset holder terminal 21 and a third connection device 13 comprising the device connector 20. The headset holder terminal 21 is in electrical contact with a headset terminal 23, whereby a rechargeable headset battery 49 can be charged when the headset 4 is docked. The second connection device 8 comprises a DECT (Digital Enhanced Cordless Telecommunications) transceiver 15 and a DECT antenna 41 for wireless communication with the headset 4. The headset base unit 1 and the headset 4 may be provided with transceivers and antennas according to the Bluetooth® or other radio standards instead of the DECT standard. The headset base unit 1 is connected to the desk phone 9 by means of a 4 wire phone cable 31 and to the laptop 10 by means of a USB cable 32.

The headset 4 comprises besides the already mentioned headset terminal 23 and headset battery 49, a headset processor 22, a speaker 24, a microphone 24, a DECT transceiver 16 and a DECT antenna 42. The mechanical parts, such as the headband 4 and the microphone arm 30 are not shown.

Figure 5:
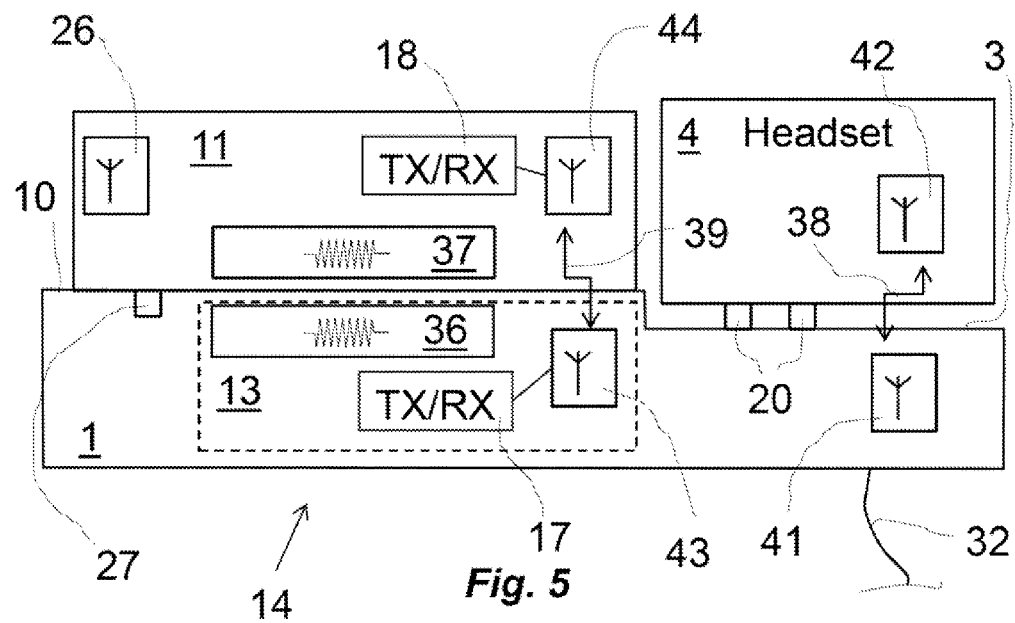
FIG. 5 is a diagram showing a headset system according to a second embodiment of the disclosure.

FIG. 5 disclose a diagram of a headset system 14 according to a second embodiment of the disclosure. In this embodiment, the device holder is simply a flat surface 10 on which the smart phone 11 can be placed. Furthermore, the headset base unit 1 and the smart phone 11 are not electrical connected when the smart phone 11 is docked. Instead, the headset base unit 1 is provided with an inductive charging transmitter circuit 36 and the smart phone 11 is provided with a corresponding inductive charging receiver circuit 37. Furthermore, the headset base unit 1 and the smart phone 11 are provided with Bluetooth® antennas 43, 44 and Bluetooth® transceivers 17, 18 for wireless communication via a Bluetooth® link 39. A base sensor 27 detects docking of the smart phone 11 and activates charging and Bluetooth® communication. Otherwise, the headset base unit 1 may work in the same manner as the first embodiment.

A variation on the above embodiment involves the construction of FIG. 8 where there are two holders 10/10a, though in the preferred embodiment, holder 10a is immediately adjacent holder 10. In such case screen 12a also includes inductive charging circuits and the placement of a smart phone in holder 10a provides sufficient proximity to charge such smart phone no charging connector is needed in the holder. If the smart phone is wirelessly connected to the base/headset, such as by Bluetooth®, then no connector is needed in the holder. This is advantageous, as smart phone manufacturers tend to change connector configurations.

It is noted that the inductive charging circuit can be used also a detector for the presence of a smart phone as it will increase current draw when in proximity.

Figure 6:
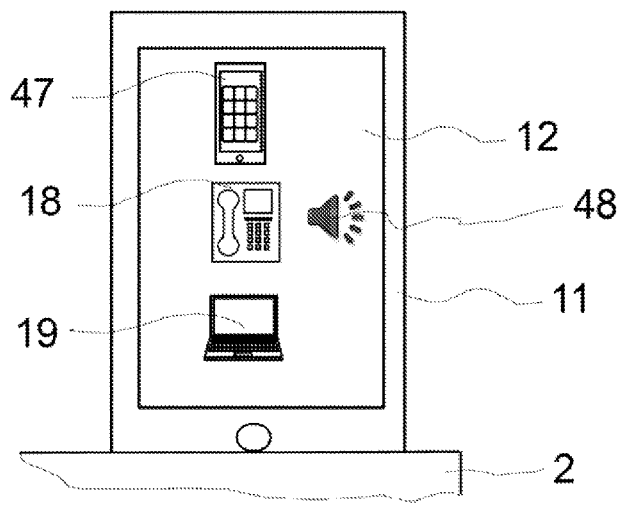
FIG. 6 is a schematic front view of a smart phone held by a headset base unit according to the disclosure.

FIG. 6 discloses a front view of the smart phone 11 when held by a headset base unit 1 and when the app for call management is activated. The touch screen display 12 discloses a smart phone icon 47, a desk phone icon 18 and a laptop icon 19. An incoming call icon 48 flashes and indicates that there is an incoming call on the desk phone 6. The user may accept the call by simply undocking the headset 4 or if it is already undocked touching the desk phone icon 18 on the touch screen display 12 of the smart phone 11. The touch screen display 12 may also show a list of contacts, call lists etc. Furthermore, contact lists may be synchronized with the desk phone 6 and the laptop 7 when the smart phone 11 is docked.

Figure 7:
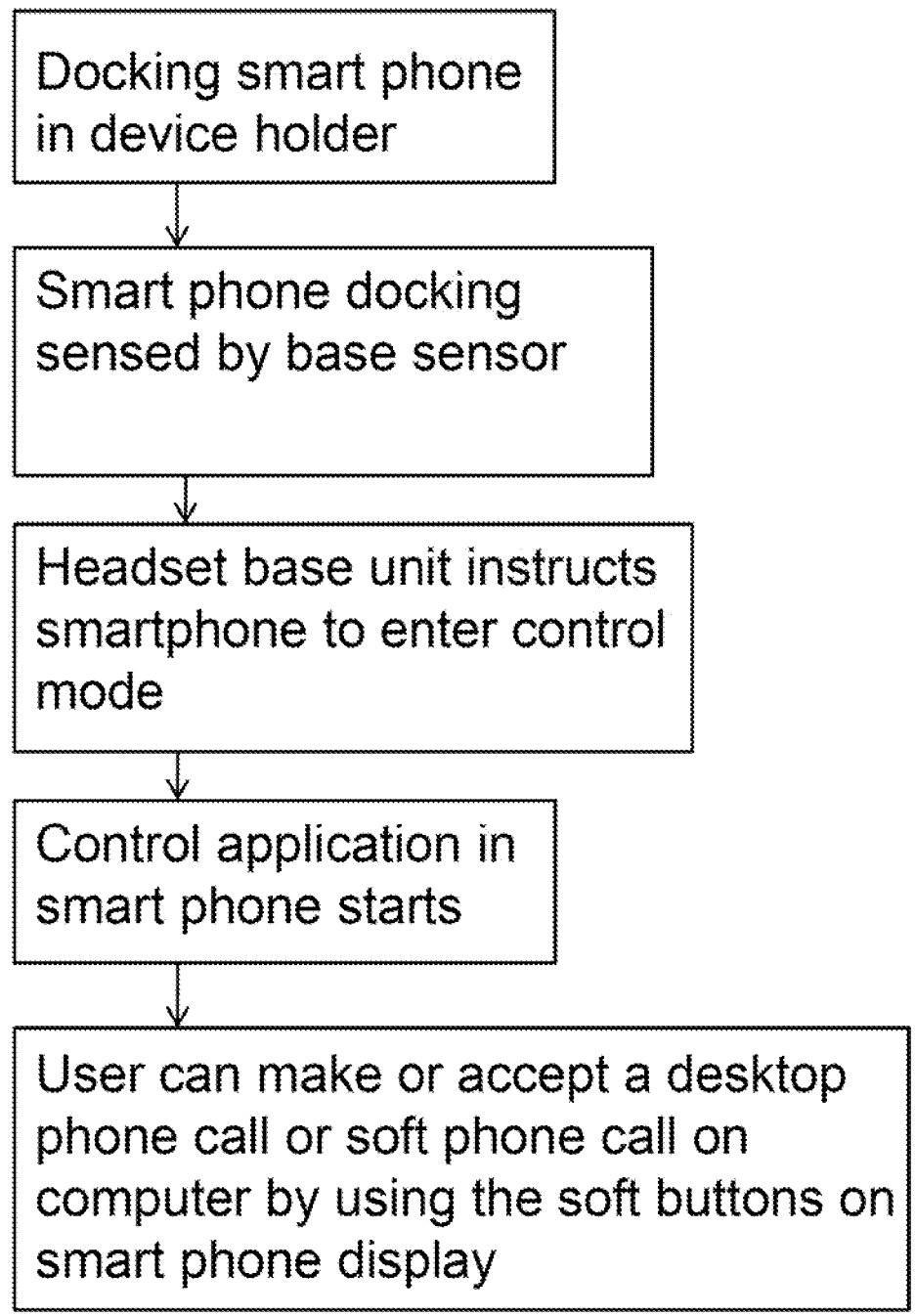
FIG. 7 is a flow diagram showing a basic use of a headset base unit according to the disclosure.

FIG. 7 discloses a flow diagram showing a basic use of a headset base unit according to the disclosure. The user may arrive at his desk and dock his smart phone in the device holder of the headset base unit. The headset and/or the smartphone sense this, where after the smart phone is instructed to enter control mode and start the installed app. Now, the user is able to manage calls on the desk phone and laptop by means of the touch screen display of the smart phone.

The invention is not limited to the embodiments shown above. Thus, the use of a smart phone may be replaced by the use of a more traditional mobile phone with a numerical key pad, a tablet computer, such as an iPad® or Samsung Galaxy Tab 10.1®, a personal PDA (personal digital assistant), a media player etc.

The headset and the headset base unit may communicate wirelessly according to the Bluetooth®, DECT or Wi-Fi standards or even other radio standards. Also, the headset may be a corded headset which is connected by a wire to the headset base unit.

The disclosure also includes a method of configuring the apparatus above. In particular, the method includes connecting multiple sources of telecommunication feeds from a plurality of communications devices, to a wireless headset controlled by a smart phone device via a base unit having a holder for the smart device having a keyboard and screen comprising:

a. providing telecommunication feeds to a base unit having a device holder and connector sized to receive a smart device;
b. running a software application on said smart device to configure said device to grant the base unit access to said keyboard and screen on said smart device;
c. controlling which telecommunication feed is linked to said headset via commands sent to via said keyboard;
d. displaying the headset link status on said screen;

whereby a user can control the telecommunications devices by the smart device.

The method also further includes a second holder located immediately adjacent and behind said first holder and wherein said controller detects the presence of a keyboard and screen device populating said holders and connects the holder, which is front most to the controller for controlling the connection between the headset and telecommunications devices.

The method also includes charging a keyboard/screen device in one of the holders with that device including an inductive charger and when a smart device is placed in the other holder adjacent thereto, it is inductively charged and its presence can be detected by the change in inductance.

LIST OF REFERENCE SIGNS

| | |
|---|---|
| 1 | headset base unit |
| 2 | base housing |
| 3 | headset holder |
| 4 | headset |
| 5 | first connection device |
| 6 | desk phone |
| 7 | laptop computer |
| 8 | second connection device |
| 9 | control means |
| 10/10a | device holder |
| 11 | mobile communication device/smart phone |

-continued

| | |
|---|---|
| 12/12a | device user interface |
| 13 | third connection device |
| 14 | headset base system |
| 15 | first transceiver |
| 16 | headset transceiver |
| 17 | second transceiver |
| 18 | device icon |
| 19 | device icon |
| 20 | device connector |
| 21 | headset holder terminal |
| 22 | headset processor |
| 23 | headset terminal |
| 24 | headset speaker |
| 25 | headset microphone |
| 26 | GSM antenna |
| 27 | base sensor |
| 28 | head band |
| 29 | end piece |
| 30 | microphone arm |
| 31 | wired connection |
| 32 | wired connection |
| 33 | connection |
| 34 | connection |
| 35 | external communications network |
| 36 | inductive charging transmitter circuit |
| 37 | inductive charging receiver circuit |
| 38 | first radio link (DECT) |
| 39 | second radio link (Bluetooth ®) |
| 40 | earphone |
| 41 | DECT antenna |
| 42 | DECT antenna |
| 43 | Bluetooth ® antenna |
| 43 | Bluetooth ® antenna |
| 45 | GSM link |
| 46 | communication system |
| 47 | device icon |
| 48 | incoming call icon |
| 49 | headset battery |

The invention claimed is:

1. A headset base unit comprising:
a base housing,
a first connection device, by which the headset base unit is connectable to at least one telecommunication device, such as a desk phone or a PC phone,
a second connection device, by which the headset base unit is connectable to a headset,
a device holder for holding a mobile communication device with a device user interface, and
a third connection device, by which the headset base unit is connectable to the mobile communication device, wherein
a controller by which an audio channel can be opened between the headset base unit and a selected one of the telecommunication devices, and wherein the headset base unit is adapted to receive control commands from the mobile communication device for controlling the selected telecommunication device connected to the first connection device, and wherein said mobile communications device includes code to transmit keystrokes on said mobile communications device to be transmitted to said controller, whereby a user can control the telecommunication device by the mobile device user interface.

2. A headset base unit according to claim 1, wherein the headset base unit comprises a headset holder for holding the headset.

3. A headset base unit according to claim 1, wherein the headset base unit is simultaneously connectable to more than one telecommunication device.

4. A headset base unit according to claim 1, wherein one or more of headset speaker volume, microphone volume, microphone mute and speaker equalisation can be adjusted by the device user interface.

5. A headset base unit according to claim 1, wherein the second connection device comprises a first transceiver for wireless connectivity to the headset, which headset is wireless and comprises a headset transceiver.

6. A headset base unit according to claim 1, wherein the third connection device comprises a second transceiver for wireless communication with the mobile communication device comprising a corresponding transceiver.

7. A headset base system comprising a headset base unit according to claim 1, wherein it comprises said mobile communication device with a device user interface.

8. A headset base system according to claim 7, wherein the user interface of the mobile communication device comprises a display.

9. A headset base system according to claim 8, wherein the display is a touch-screen display.

10. A headset base system according to claim 9, wherein the display is adapted to display a keypad for entering a telephone number.

11. A headset base system according to claim 9, wherein said connected telecommunication device can be selected by touching a device icon representing the telecommunication device.

12. A headset base system according to claim 8, wherein a caller identity icon is shown on the display when there is an incoming call on said connected telecommunication device.

13. A headset base system according to claim 5, wherein the base housing includes a display and wherein the display is adapted to show battery status of the headset.

14. A communication system comprising a headset system according to claim 1 and at least one connected telecommunication device, wherein the headset base unit is adapted to be able to instruct a connected telecommunication device to initiate an outgoing call.

15. A headset base unit comprising:
a base housing,
a first connection device, which the headset base unit is connectable to at least one telecommunication device, such as a desk phone or a PC phone,
a second connection device, which the headset base unit is connectable to a headset,
first and second adjacent device holders for holding a screen and keyboard device in one or both holders with a device user interface, and
a third connection device, which the headset base unit is connectable to a mobile communication device, wherein
a controller configurable to detect the presence of said mobile device in one of said holders by which an audio channel can be opened between the headset base unit and a selected one of the telecommunication devices, and that the headset base unit is adapted to receive control commands from the mobile communication device in one of said holders for controlling the selected telecommunication device connected to the first connection device, whereby a user can control the telecommunication device by the device user interface and
wherein the controller determines which holder is populated with a screen and keyboard device and selects communication with one such device.

16. The unit of claim 15 wherein said first and second holders are arranged with the first holder in front of the second and wherein the controller is configured to select the front most holder which is populated with a screen and keyboard device.

17. The unit of claim 15 wherein said first and second holders are arranged with the first holder in front of the second and wherein said second holder is populated with a screen and keyboard device further having an inductive charging circuit therein, and when said first holder is populated with a removable device, it may be inductively charged by its proximity with the device in the second holder.

18. The unit of claim 15 wherein controller determines the presence of devices in the holders and communicates with the front most holder populated with a device.

19. A method of connecting multiple sources of telecommunication feeds from a plurality of communications devices, to a wireless headset controlled by a smart phone device via a base unit having a first holder for the smart phone device having a keyboard and screen comprising:
   a. providing telecommunication feeds to a base unit having a device holder and connector sized to receive a smart device;
   b. running a software application on said smart device to configure said smart phone device to grant the base unit access to said keyboard and screen on said smart device;
   c. controlling said telecommunication feed which is linked to said headset via commands sent via said keyboard;
   d. displaying the headset link status on said screen;
   whereby a user can control the telecommunications devices by the smart phone device.

20. The method of claim 19 further including a second holder located immediately adjacent and behind said first holder and wherein said controller detects the presence of a keyboard and screen device populating said holders and connects the holder which is front-most to the controller for controlling the connection between the headset and telecommunications devices.

\* \* \* \* \*